3,810,950
PROCESS FOR CONVERTING REACTANT INTO PRODUCT INCLUDING ADSORPTION-DESORPTION CYCLE FOR RECYCLE OF UNREACTED REACTANT
Robert A. Woodle, Nederland, Tex., assignor to Texaco Inc., New York, N.Y.
Filed Dec. 13, 1971, Ser. No. 207,278
Int. Cl. C07c 5/10
U.S. Cl. 260—667    14 Claims

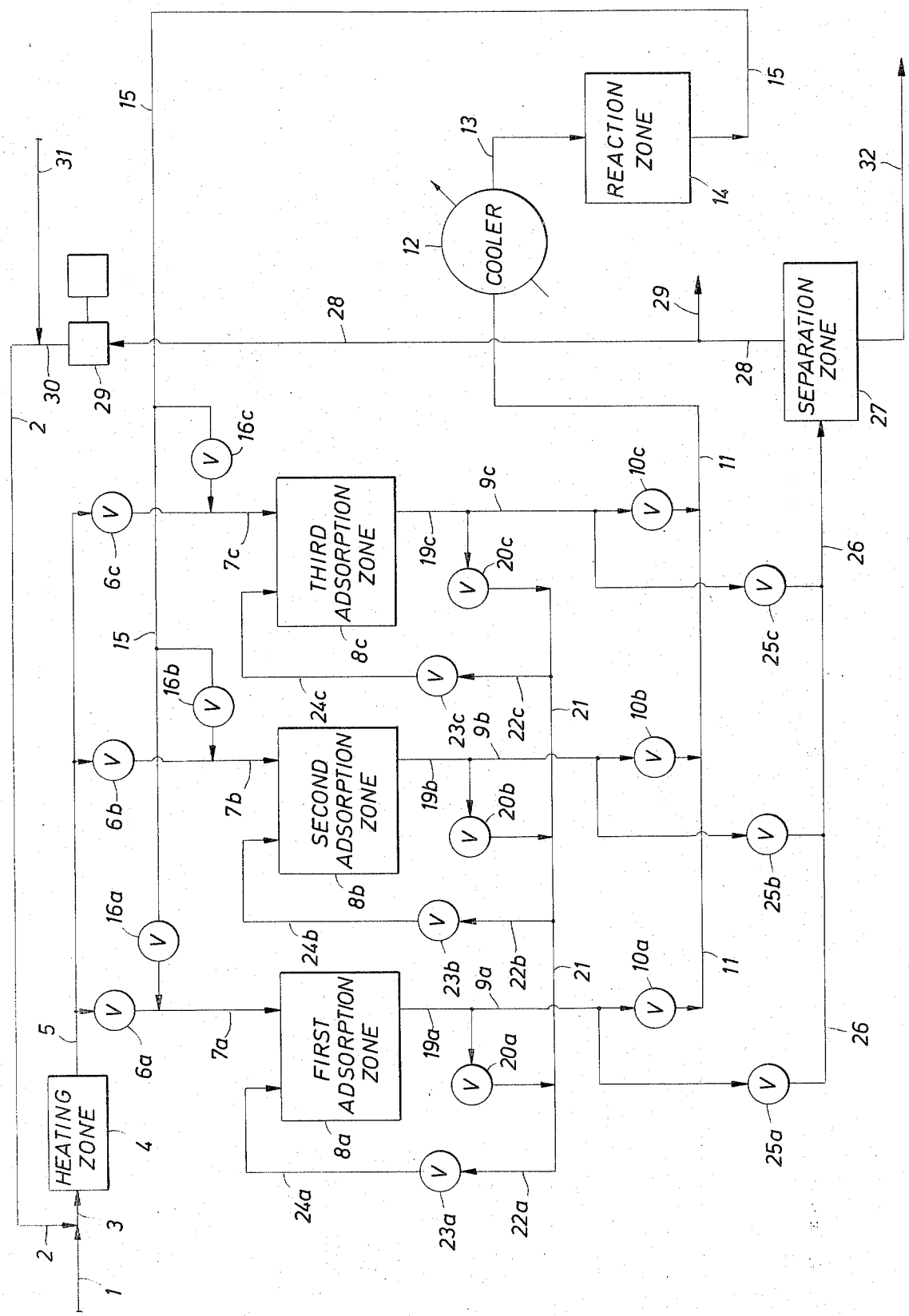

ABSTRACT OF THE DISCLOSURE

A process for increasing the conversion of a reactant hydrocarbon into a desired product wherein reactant contained in a reaction mixture is partially converted into desired product. Such process comprises adsorbing, at a relatively low temperature, reactant hydrocarbon from the reaction effluent stream into a solid adsorbent selective for such reactant and subsequently desorbing reactant from the solid adsorbent employing reaction charge at an elevated temperature. The desorbed reactant is returned to the reaction for conversion into additional amounts of desired product. Such a process has particular applicability for such reactions as isomerization where an equilibrium exists between reactant and product.

BACKGROUND OF THE INVENTION

Field of the invention

The present invention relates to a continuous process for carrying out equilibrium reactions wherein the conversion of a reactant into a desired product is limited by the reverse reaction of desired product into reactant. Also, the present invention is related to a continuous process for conversion of a reactant into a desired product wherein the product yield is limited by the increased conversion of product into undesirable materials as the concentration of product increases in the reaction mixture. More particularly, the present invention relates to a process wherein a process charge mixture comprising an adsorable reactant at an elevated temperature is employed to desorb reactant from a first adsorption zone; wherein effluent from the first adsorption zone is treated in a reaction zone to convert a portion of the reactant into a desired product; wherein reactant from the reaction zone effluent, comprising reactant and desired product, is adsorbed in a second adsorption zone at a temperature lower than the temperature in the first adsorption zone; wherein effluent from the second adsorption zone cools a third adsorption zone from about the temperature of the first adsorption zone to about the temperature of the second adsorption zone; and wherein effluent from the third adsorption zone comprising desired product is recovered as a product stream.

Prior art

In many processes, the conversion of a reactant into a desired product is limited. For instance, the reaction involved may be reversible and as the desired product increases in concentration, its rate of conversion into reactant approaches the rate of conversion of reactant into product. Also, the yield of desired product from the conversion of reactant may be limited by a second reactant wherein the desired product is converted into undesired materials. In such cases the concentration of desired product in the reaction mixture must be maintained at a relatively low value to minimize losses due to the second reaction. In such processes, it is known to recover unconverted reactant from the reaction effluent by a physical separation means such as distillation, extraction, adsorption, etc. The recovered reactant may then be returned to the conversion process for conversion into additional desired product.

Distillation means, although practical in many instances, for the separation of unconverted reactant from a reaction effluent, are limited in usefulness when the boiling temperatures of the reactant and the product are close or when the reactant forms an azeotrope with the product and cannot be effectively separated therefrom.

Extraction means for separating a reactant from a reaction product require facilities for contacting an extractant with the reaction product and subsequently separating the extracted materials from the extractant. Means must also be supplied for circulating lean extractant to an extraction zone and rich extractant to a stripping zone wherein the extracted materials are separated from the extractant.

In adsorption methods of the prior art, where unconverted reactant is separable from the reaction effluent, such adsorption processes comprise the following steps:

A. A reaction effluent is contacted with an adsorbent to separate reactants from product;
B. The adsorbent, containing adsorbed material, is treated with an eluting medium to desorb materials therefrom;
C. The adsorbent, containing eluting materials, is freed of such eluting materials;
D. Desorbed materials are separated from the eluting material; and
E. Reaction effluent is returned to contact with the adsorbent.

Such adsorption processes are cyclic and commonly several adsorption zones containing adsorbent are used such that one adsorption zone is continuously in adsorption service.

SUMMARY OF THE INVENTION

Now, according to the present invention, in a process wherein a reactant is only partially converted into a desired product, wherein said reactant may be selectively adsorbed from a reaction zone effluent, and wherein adsorbed reactant may be desorbed by changing physical conditions such as increasing temperature and/or decreasing pressure, an improved process for increasing the conversion of reactant into desired product has been discovered. Additionally, a unique processing system is provided for separating unconverted reactant from a reaction effluent and returning said reactant to a reaction zone for conversion into additional desired product. In the present invention only process streams are employed in the recovery of the unconverted reactant and no external streams such as eluting materials are required.

The system of the present invention comprises a heating means for heating a process charge stream to a temperature sufficient to desorb reactant from a first adsorbent bed; a conduit means for passing heated process charge stream from the heating means to the inlet of the first adsorbent bed; a first adsorbent bed comprising an adsorbent selective for reactant and containing adsorbed reactant; a second conduit means for passing first adsorbent bed effluent, comprising process charge and desorbed reactant, to a reaction zone; a reaction zone for converting reactant into desired product; a cooling means for reducing the temperature of the reaction zone effluent to a temperature sufficiently low to allow adsorption of unconverted reactant from a reaction zone effluent stream; a conduit means for passing reaction zone effluent into a second adsorbent bed; a second adsorbed bed selective for the adsorption of unconverted reactant from the reaction zone effluent and having capacity to adsorb unconverted reactant; a third conduit means for passing effluent from the second adsorbent zone to a third adsorbent zone; a third adsorbent bed comprising an adsorbent selective of the reactant, such third adsorbent bed having a temperature above the temperature of the second adsorbent bed and having capacity to adsorb unconverted reactant; and a fourth conduit means for recovering effluent from the third adsorbent bed which effluent comprises the desired reaction product. Valving means are provided such that the process flow may be cyclically changed in such a manner that each of the three adsorbent beds will sequentially switch from the desorption position to the cooling position to the adsorption position and back to the desorption position.

The process of the present invention comprises heating the process charge stream to a temperature sufficiently high to desorb reactant from a first adsorption bed; desorbing reactant from a first adsorbent bed; reacting effluent from the first adsorbent bed in a reaction zone to convert reactant into a desired product; cooling reaction zone effluent to a temperature such that an adsorbent will selectively adsorb reactant from the reaction zone effluent; adsorbing reactant from the reaction zone effluent in a second adsorbent bed; cooling a third adsorbent bed from about the temperature of the first adsorbent bed to about the temperature of the second adsorbent bed; and recovering an effluent comprising desired product from the third adsorbent bed. According to the process of the present invention, the desorption step, the cooling step and the adsorption step are cyclic. When the second adsorbent bed is saturated with reactant the second adsorbent bed is switched from the adsorption cycle to the desorption cycle. The first adsorbent bed which is on the desorption cycle is switched to the cooling cycle and the third adsorbent bed is switched from the cooling cycle to the adsorption cycle.

The advantages of the present invention include improving the purity of desired product by removing unconverted reactant therefrom, and recovering unconverted reactant fom the reaction effluent for conversion into additional desired product, thereby improving the overall conversion of reactant into desired product. Additionally, the unconverted reactant may be recovered from the reaction effluent employing the cyclic adsorption, desorption, and cooling steps which are effected using only process streams. No external streams such as eluting material are necessary to carry out the process of the present invention. These and other advantages of the present invention will be more fully described in the detailed description of the invention which follows.

BRIEF DESCRIPTION OF THE DRAWING

The attached drawing is a schematic representation of a process which embodies the method of the present invention.

DETAILED DESCRIPTION OF THE INVENTION

Reactions for which the method of the present invention is applicable include those in which a reactant is incompletely converted in a reaction zone and in which the reactant may be selectively adsorbed from the reaction zone effluent. Such reactions include those in which an equilibrium exists between reactant and product in the reaction mixture, and those in which it is desirable to maintain the product concentration at a relatively low value in the reaction mixture. Reactions which are within the contemplation of the present invention may be catalytic or noncatalytic. Such reactions may comprise the conversion of a reactant into a different form or may comprise reaction of a reactant with one or more other components. Examples of such reactions include isomerization such as the conversion of straight chain hydrocarbons into branch chain hydrocarbons, and hydrogenation such as the conversion of benzene into cyclohexane. Isomerization reactions are reversible and an equilibrium exists between straight chain paraffin hydrocarbons and branch chain hydrocarbons in the reaction zone such that complete conversion of the straight chain hydrocarbons may not be obtained. In hydrogenation reactions, such as conversion of benzene to cyclohexane, as the concentration of benzene decreases, hydrogenation of the remaining benzene is progressively more difficult. To obtain high purity cyclohexane uncontaminated by benzene from the reaction zone, undesirably high temperatures or long reaction times must be employed. Separation of residual benzene from cyclohexane product by distillation is difficult since cyclohexane and benzene form an azeotropic mixture.

Reactants which may be used in the present invention include those which may be selectively adsorbed from the reaction effluent. For instance, normal paraffins may be selectively adsorbed into zeolitic molecular sieves and product isoparaffins are not adsorbed. Also, aromatic hydrocarbons such as benzene may be selectively adsorbed upon selective adsorbents such as silica gel and nonaromatic hydrocarbons such as cyclohexane are not adsorbed.

Adsorbents which may be used in the present invention include those which are selective for the reactant hydrocarbon and which do not adsorb the reaction products. Additionally, the adsorptive capacity of these selective adsorbents for the reactant must be higher at a lower temperature and must allow desorption of the reactant at an increased temperature. It is within the contemplation of the present invention that the adsorbents comprise solid adsorbents. Examples of adsorbents which may be employed include alumina-silicates, zeolitic molecular sieve, silica gel, activated carbon, activated alumina and activated clays. The particular adsorbent selected will depend upon the reactant to be adsorbed and the product and other components of the reaction effluent which are not to be adsorbed.

In order to better describe the present invention reference is now made to the attached drawing. For the sake of clarity many elements commonly employed in the operation of a process, such as pumps, instrumentation, valves, etc. which are unnecessary for the proper description of the present invention have been eliminated. Such elements may be readily supplied by one skilled in the art. It is to be understood that the attached drawing shows one means embodying the present invention, it is not intended to limit the scope of the invention in any way. Many modifications will occur to those skilled in the art which are within the spirit and scope of the appended claims.

Referring now to the drawing which shows an isomerization process for the conversion of normal paraffins hydrocarbons into isoparaffin hydrocarbons, a process charge stream comprising normal paraffin hydrocarbons in line 1 and hydrogen in line 2 is mixed. This mixture passes via line 3 into a heater 4 wherein the mixture is heated to a temperature of about 600° F. at a pressure of about 550 p.s.i.g. From the heater 4 the heated mixture passes via line 5 through valve 6a and line 7a into a first adsorption zone 8a. The first adsorption zone 8a contains an adsorbent bed comprising a synthetic crystalline aluminosilicate zeolitic molecular sieve having uniform pore openings of about 5 angstroms. The adsorbent bed contains adsorbed normal paraffin hydrocarbon reactants which were unconverted in a first pass through an isomerization reaction zone as will hereinafter be described. The heated process charge mixture desorbs normal paraffin hydrocarbons from the first adsorbent bed and effluent from the first adsorption zone passes via line 19a and 9a through valve 10a and line 11 to a cooler 12. In the cooler 12 the first adsorber effluent is cooled to a temperature of about 300° F., and passes via line 13 into a reaction zone 14.

Reactor 14 contains an isomerization catalyst comprising about 0.60 weight percent platinum deposited upon an alumina base. Normal paraffins in the presence of isomerization catalyst are converted to isoparaffins, The reaction is, however, reversible and an equilibrium exists between the concentration of isoparaffins and normal paraffins in the reaction mixture. Therefore, effluent from reactor 14 comprises isoparaffin product as well as unreacted normal paraffins. The reactor effluent passes via line 15 at a temperature of about 300° F. through valve 16c and line 7c into a third adsorption zone 8c.

In the third adsorption zone 8c a bed of molecular sieve adsorbent similar to the adsorbent in the first adsorption zone 8a is employed to adsorb normal paraffin hydrocarbons from the reaction effluent stream at a temperature of about 300° F. Third adsorption zone effluent, depleted in normal paraffin hydrocarbons, passes via line 19c through valve 20c into line 21. From line 21 the third adsorber effluent passes via line 22b through valve 23b into line 24b. From line 24b the third adsorber effluent passes into a second adsorption zone 8b which contains a bed of zeolitic molecular sieves similar to that contained in the first adsorption zone 8a. The adsorbent bed in the second adsorption zone 8b is depleted in adsorbed normal paraffin hydrocarbons and is at a temperature between the temperature of the first adsorption zone 8a and the temperature of the third adsorption zone 8c, that is, from about 600° F. to about 300° F. The third adsorption zone effluent, at a temperature of about 300° F. cools the second adsorbent bed from a temperature of about 600° F. to a temperature of about 300° F. Effluent from the second adsorption zone 8b passes via line 19b and line 9b through valve 25b into line 26. From line 26 second adsorption zone effluent passes into separation zone 27 wherein gaseous components such as hydrogen and low molecular weight hydrocarbons are separated from liquid components. From separation zone 27 gaseous components are recovered via line 28. A portion of such gaseous components are vented via line 29 to maintain the concentration of low molecular weight hydrocarbons therein at a relatively low value. The remainder of the gaseous components pass via line 28 into compressor 29 and from compressor 29 into line 30 as a recycle gas stream. Makeup hydrogen is added to the gaseous components via line 31 and the recycle gas mixture is transferred via line 2 for mixture with additional process charge hydrocarbons as hereinbefore described.

A liquid hydrocarbon stream comprising isoparaffin hydrocarbons suitable for use as gasoline blend stock is recovered from seperation zone 27 via line 32.

All valves not hereinabove described as being open are closed during this step of the process. The adsorption, desorption, and cooling steps of the process are cyclic. Flow of reaction effluent is maintained through the third adsorption zone 8c until the adsorbent bed is saturated with normal paraffin hydrocarbons. Upon saturation of the adsorbent bed in the third adsorption zone 8c, appropriate valves are opened and closed such that the third adsorption zone 8c is switched from the adsorption cycle to the desorption cycle, the first adsorption zone 8a is switched from the desorption cycle to the cooling cycle, and the second adsorption zone 8c is switched from the cooling cycle to the adsorption cycle. Thus, each adsorption zone is sequentially upon an adsorption cycle, a desorption cycle, a cooling cycle, and returns to another adsorption cycle.

EXAMPLE I

In this example a $C_5$–$C_6$ range straight run gasoline fraction was isomerized in the presence of hydrogen over a catalyst comprising about 0.60% platinum supported upon an alumina base. By such an isomerization reaction, normal paraffins hydrocarbons are converted to isoparaffin hydrocarbons and the octane rating of the gasoline fraction may be substantially increased. The isomerization reaction was carried out in a continuous process comprising charging 5,000 cc. per hour of the gasoline fraction into a reaction zone containing isomerization catalyst. The reaction temperature was maintained at 300° F. and the pressure was maintained at 500 p.s.i.g. A liquid hourly space velocity of 2.0 volumes of gasoline per volume of catalyst per hour was maintained in the reaction zone. A hydrogen to hydrocarbon mole ratio of 1.25:1 was maintained in the reaction zone.

The $C_5$–$C_6$ straight run gasoline fraction comprised about 34.4 volume percent normal paraffin hydrocarbons and about 65.6 volume percent isoparaffin hydrocarbons. The octane rating of the straight run gasoline fraction was 73.7 research octane, clear, and 91.2 research octane, plus 3 cc. tetraethyl lead.

In a first run the method of the present invention was not employed and the straight run gasoline under operating conditions as described above was charged directly to the reaction zone. Reaction effluent was separated into a vapor fraction and a liquid fraction. The vapor fraction was recirculated along with make-up hydrogen for mixture with additional process charge and the liquid fraction was recovered as product gasoline. The result of this first base run was, the octane of the product gasoline increased over the octane of the straight run fraction charged to the process. The octane number of the first gasoline product was 82.3 research octane, clear, and 96.3 research octane plus 3 cc. tetraethyl lead.

In order to show the advantage of the present invention, a second run was made employing a flow scheme substantially as shown in FIG. 1 of the drawing. The isomerization catalyst and reaction conditions were maintained the same as during the first run described above. Each of the three adsorption vessels employed contained a volume of molecular sieve equal to about ⅓ the volume of isomerization catalyst employed in the reaction zone. The molecular sieve adsorbent comprised a sodium alumino-silicate crystalline zeolitic molecular sieve having uniform pore openings of about 5 angstrom units, such sieve having the ability to preferentially adsorb straight chain hydrocarbons to the exclusion of isoparaffin hydrocarbons. Flow through the process was established with each of the adsorption vessels being on the adsorption cycle for 15 minutes, the desorption cycle for 15 minutes, and the cooling cycle for 15 minutes. The straight run gasoline fraction-hydrogen recycle mixture was heated to a temperature of about 600° F. and passed through the adsorption vessel upon the desorption cycle to desorb straight chain hydrocarbons therefrom. Effluent from the adsorber upon the desorption cycle was cooled to a temperature of about 300° F. and the effluent was passed to the reaction zone under substantially the operating conditions described in the base run above. Effluent from the reaction zone at a temperature of about 300° F. was passed into an adsorption vessel upon the adsorption cycle wherein normal paraffin hydrocarbons were adsorbed from the reaction effluent stream. Effluent from the adsorption vessel upon the adsorption cycle was passed to the adsorption vessel upon the cooling cycle. The adsorption cycle effluent cooled the adsorption vessel upon the cooling cycle from a temperature of about 600° F. to about 300° F. before termination of the cooling cycle.

Cooling cycle effluent was pased into a vapor liquid separator wherein a vapor fraction comprising recycle hydrogen was separated from a liquid fraction comprising product gasoline. The octane number of the product gasoline obtained by following the method of the present invention was determined to be 93.0 research octane clear and 104.0 research octane plus 3 cc. tetraethyl lead.

The octane number of isoparaffin hydrocarbons in the $C_5$–$C_6$ range is substantially higher than the octane number of normal paraffin hydrocarbons of the same range. Therefore by comparing the octane numbers of the product gasolines obtained from the first run and from the second run, it can be seen that the conversion of normal paraffin hydrocarbons to isoparaffin hydrocarbons is substantially higher when following the method of the present invention.

In the present invention, process charge is heated to a temperature sufficient to desorb reactant from a selected adsorbent. Such heating may be accomplished by any convenient heating means such as a heat exchanger or a fired heater. The source of heat for a heat exchanger may be, for example, steam or other high temperature sources and the heater may be fired with such fuels as fuel gas or oil.

The heated process charge stream may be in a vapor phase, a liquid phase, or a mixed phase which is suitable to desorb reactant hydrocarbon from the selective adsorbent. The selective adsorbent may comprise, as hereinabove described, any solid desorbent which will selectively adsorb the desired reactant to the exlusion of the product and from which the reactant may be subsequently desorbed by the heated process stream.

The selective adsorbent is contained in a first adsorption zone, a second adsorption zone, and a third adsorption zone. The selective adsorbent may be present in each adsorption zone in one or more beds and each adsorption zone may comprise one or more vessels in series or parallel configuration as best meets the needs of the particular process.

Effluent from the adsorption zone being desorbed, which comprises process charge and desorbed reactant, may be treated to adjust the effluent to the desired reaction conditions. Such effluent may be heated or cooled, vaporized or condensed as required to establish the desired operating conditions within the reaction zone.

The reaction zone may comprise any configuration which is convenient for carrying out the reaction of the process. For example, the reaction zone may comprise a vessel, a tube, a plurality of vessels in series or parallel configuration, etc. The reaction zone may contain catalyst or not, as required. Additional streams may be added to the reaction zone other than the stream from the adsorber being desorbed such as, for example, quench streams, additional reactant streams, etc.

Effluent from the reaction zone which enters the adsorption cycle for adsorption of unconverted reactant must be at a temperature at which selective adsorbent will adsorb the reactant. It is within the contemplation of this invention that the reaction effluent stream be maintained at such a temperature either by carrying the reaction out at such a temperature or by cooling the reaction zone effluent to the desired temperature. Any convenient cooling means, such as for example, fin-fan coolers and water cooled heat exchangers may be employed. Effluent from the adsorption cycle is passed into the cooling cycle. An adsorption zone on the cooling cycle begins at the temperature of the desorption cycle and is cooled by the adsorption cycle effluent to about the temperature of the adsorption cycle. Cooling cycle effluent is treated to recover a stream comprising the desired product.

Many modifications and variations of the invention as hereinbefore set forth will occur to those skilled in the art. Therefore, all such modifications and variations which are within the spirit and scope of the invention herein are included and only such limitations should be imposed as are indicated in the appended claims.

I claim:

1. In a hydrocarbon conversion process wherein reactant hydrocarbon is partially converted into desired product hydrocarbon in the presence of catalyst and hydrogen containing gas at an elevated temperature and pressure in a reaction zone, wherein unconverted reactant hydrocarbon is selectively adsorbed into a solid selective adsorbent from reaction zone effluent, and wherein reactant hydrocarbon is desorbed from said solid adsorbent for recycle to the reaction zone; the improvement which comprises:

(a) heating a process charge stream comprising reactant hydrocarbon to a higher desorption temperature;

(b) flowing heated process charge stream of step (a) through a first adsorption zone containing reactant hydrocarbon adsorbed upon a first bed for desorption of said adsorbed reactant hydrocarbon;

(c) reacting first adsorption zone effluent comprising process charge and desorbed reactant hydrocarbon in the reaction zone to convert reactant hydrocarbon into desired product;

(d) contacting reaction zone effluent, comprising unconverted reactant hydrocarbon and desired product, with a second bed solid adsorbent in a second adsorption zone at an adsorption temperature lower than said desorption temperature, for adsorption of reactant hydrocarbon;

(e) flowing effluent from said second adsorption zone through a third adsorption zone for cooling a third bed of solid adsorbent from a temperature of about the desorption cycle temperature to a temperature of about the adsorption cycle temperature; product stream substantially free of reactant hydrocarbon; and (f) recovering third adsorption zone effluent as a product stream substantially free of reactant hydrocarbon; and (g) continuing this procedure until the adsorptive power of the first solid adsorbent bed is substantially depleted and changing the first adsorption zone to step (e), the second adsorption zone to step (b), and the third adsorption zone to step (d) then proceeding with the process above.

2. A continuous process according to claim 1 wherein three adsorption zones containing selective adsorbent are employed, wherein each adsorption zone is sequentially upon the absorption cycle, the desorption cycle, the cooling cycle and the absorption cycle, and wherein switching of each adsorption zone from one cycle to the next cycle in sequence occurs simultaneously.

3. The process of claim 2 wherein the duration of each cycle is for a selected time period.

4. The process of claim 2 wherein the duration of each cycle is determined by the adsorptive capacity of the adsorption zone being employed in the adsorption cycle.

5. The method of claim 4 wherein the reaction is an isomerization reaction, wherein the reactant is a normal paraffin hydrocarbon, and wherein the product is an isoparaffin hydrocarbon.

6. The method of claim 5 wherein the adsorbent comprises a crystalline alumino-silicate zeolitic molecular sieve having pore openings of about 5 angstrom units.

7. The method of claim 6 wherein the reactant comprises normal paraffins in the gasoline boiling range and the product comprises isoparaffins in the gasoline boiling range.

8. The method of claim 4 wherein the reaction is a hydrogenation reaction, the reactant is benzene, and the product is cyclohexane.

9. The method of claim 8 wherein the adsorbent is silica gel.

10. The method of claim 4 wherein a thermodynamic equilibrium exists between reactant and product in the reaction zone.

11. In a hydrocarbon isomerization process for conversion of normal paraffin hydrocarbons into isoparaffin hydrocarbons within a catalytic reaction zone, wherein unconverted normal paraffin hydrocarbons are selectively adsorbed from reaction zone effluent into solid adsorbent contained within an adsorption zone operating upon an adsorption cycle at a lower adsorption temperature, wherein isoparaffin hydrocarbons are substantially unadsorbed by said solid adsorbent, wherein previously adsorbed normal paraffin hydrocarbons are desorbed from solid adsorbent contained within an adsorption zone operating upon a desorption cycle at a higher desorption temperature, and wherein a solid adsorbent, previously desorbed of normal paraffin hydrocarbon, contained within an adsorption zone operating upon a cooling cycle is cooled from about the higher desorption temperature to about the lower adsorption temperature; the improvement which comprises:
- (a) heating a process charge stream comprising normal paraffin hydrocarbons to said higher desorption temperature;
- (b) flowing, in a desorption cycle, heated process charge steam of step (a) through an adsorption zone containing solid adsorbent and previously adsorbed normal paraffin hydrocarbon for desorption of said normal paraffins from solid adsorbent into the heated process charge stream;
- (c) cooling desorption cycle effluent, comprising process charge and desorbed normal paraffins from about said desorption cycle temperautre to about isomerization reaction temperature;
- (d) isomerizing, in the reaction zone, normal paraffins contained in the cooled effluent of step (c) to form isoparaffin hydrocarbons;
- (e) flowing, in an adsorption cycle, reaction zone effluent, at the lower adsorption temperature through an adsorption zone containing solid adsorbent for adsorption of normal paraffins from said reaction zone effluent until said solid adsorbent contains a preselected level of normal paraffin hydrocarbons;
- (f) flowing, in a cooling cycle, effluent from the adsorption zone operating upon adsorption cycle through an adsorption zone operating upon a cooling cycle and previously employed in a desorption cycle for cooling solid adsorbent from about said higher desorption temperature to about said lower adsorption temperature;
- (g) recovering effluent from the adsorption zone operating upon the cooling cycle as a product stream comprising isoparaffin hydrocarbon and substantially free of normal paraffin hydrocarbon; and
- (h) switching an adsorption zone from the adsorption cycle to the desorption cycle, switching an adsorption zone from the cooling cycle to the adsorption cycle, and switching an adsorption zone from the desorption cycle to the cooling cycle, when normal paraffin content of an adsorption zone operating upon the adsorption cycle reaches the preselected limit.

12. The process of claim 11 wherein normal paraffin hydrocarbons reactant comprise $C_5$–$C_6$ hydrocarbons and wherein solid adsorbent is silica-alumina zeolitic molecular sieve having uniform pore opening of about 5 angstrom units.

13. In a hydrogenation process for conversion of aromatic hydrocarbons to cyclo-aliphatic hydrocarbons within a catalytic reaction zone, wherein unconverted aromatic hydrocarbons are selectively adsorbed from reaction zone effluent into solid adsorbent contained within an adsorption zone operating upon an adsorption cycle at a lower adsorption temperature, wherein cyclo-aliphatic hydrocarbons are substantially unadsorbed by solid adsorbent, wherein previously adsorbed aromatic hydrocarbons are desorbed from solid adsorbent contained within an adsorption zone operating upon a desorption cycle at a higher desorption temperature, and wherein a solid desorbent previously desorbed of aromatic hydrocarbon and contained within an adsorption zone operating upon a cooling cycle is cooled from about the higher desorption temperature to about the lower adsorption temperature; the improvement which comprises:
- (a) heating a process charge stream comprising aromatic hydrocarbons to said higher desorption temperature;
- (b) flowing heated process charge stream of step (a) through an adsorption zone operating upon a desorption cycle for desorbing previously adsorbed aromatic from solid adsorbent into the heated process charge stream;
- (c) cooling desorption cycle effluent, comprising process charge and desorbed aromatics, from about the higher desorption cycle temperature to about hydrogenation reaction temperature;
- (d) hydrogenating, in the reaction zone, aromatic hydrocarbons contained in the cooled effluent of step (c) to form cyclo-aliphatic hydrocarbons;
- (e) flowing reaction zone effluent through an adsorption zone operating upon an adsorption cycle at the lower adsorption temperature for adsorption of unreacted aromatic hydrocarbons until solid adsorbent in the adsorption zone contains a preselected level of aromatic hydrocarbons;
- (f) flowing adsorption cycle effluent through an adsorption zone operating upon a cooling cycle for cooling solid adsorbent from about said higher desorption temperature to about said lower adsorption temperature; and
- (g) recovering cooling cycle effluent as a product stream comprising cyclo-aliphatic hydrocarbons and substantially free of normal paraffin hydrocarbons.

14. The process of claim 13 wherein the aromatic hydrocarbon is benzene, the cyclo-aliphatic hydrocarbon is cyclohexane and the solid adsorbent is silica gel.

References Cited
UNITED STATES PATENTS

| | | | |
|---|---|---|---|
| 2,983,668 | 5/1961 | Hemminger | 208—99 |
| 3,306,841 | 2/1967 | Ward | 208—134 X |
| 3,463,829 | 8/1969 | Steffgen | 260—667 |
| 3,927,361 | 2/1969 | Arnold | 260—667 |
| 2,392,284 | 1/1946 | Gage | 260—683.66 |
| 3,421,984 | 1/1969 | Jensen et al. | 260—676 AD |

DELBERT E. GANTZ, Primary Examiner

J. M. NELSON, Assistant Examiner

U.S. Cl. X.R.

208—95, 99; 260—683.65; 55—387; 62—94